United States Patent Office 3,485,724
Patented Dec. 23, 1969

3,485,724
COLORIMETRIC DETERMINATION OF CREATINE PHOSPHOKINASE
Louis Berger, 8687 Spoon, University City, Mo. 63130; Daniel Broida, 110 Dielman Road, La Due, Mo. 64758; and Leo F. Bressler, 1145 Blancha Court, University City, Mo. 63130
No Drawing. Filed June 27, 1966, Ser. No. 560,826
Int. Cl. C12k 1/10
U.S. Cl. 195—103.5                              6 Claims

ABSTRACT OF THE DISCLOSURE

Adenosine diphosphate is mixed with phosphocreatine in the presence of an unknown quantity of creatine phosphokinase to form adenosine triphosphate and creatine. At the end of a predetermined period the reaction is stopped by addition of p-hydroxymercuribenzoate. α-Naphthol and diacetyl are added directly to the reaction mixture and after a color development period the mixture is centrifuged without deproteinizing. The depth of color formed is then related to CPK activity.

---

This invention relates to the determination of the amount of creatine phosphokinase (CPK) in serum and other animal media, such, for example, as extracts of animal tissues, as distinguished from purified enzyme.

An increase in CPK activity of sera accompanies certain types of progressive muscular dystrophy and myocardial infarction, though no elevation has been observed in liver diseases or pulmonary infarction, making the CPK level a helpful aid in differential diagnosis.

A number of procedures for measuring CPK have been proposed. The present invention is an improvement in the methods described by Ennor and Stocken (1948) Biochem. J. 42, 557; Ennor and Rosenberg (1954) Biochem. J. 57, 203; Chappell and Perry (1954) Biochem. J. 57, 421; Hughes (1962) Clin. Chim. Acta, 7, 597–603.

The present method is based upon the following reaction:

1. Adenosine Diphosphate + Phosphocreatine $\xrightarrow{CPK}$ Adenosine Triphosphate + Creatine 2. Creatine + α-Naphthol + Diacetyl $\longrightarrow$ Color Complex The first reaction is reversible, but under the conditions of the method of this invention, the amount of creatine produced is a function of the amount of CPK present.

Methods known heretofore, in which the above reactions were utilized in the determination of CPK in serum have involved the deproteinization of the test solution by the method of Somogyi, J. Biol. Chem., 160 (1945) 69, or its equivalent, which involves the producing of a flocculent precipitate with which the protein is brought down.

One of the objects of this invention is to provide a method of determining CPK which is simple, and less time consuming than methods known heretofore.

Other objects will become apparent to those skilled in the art in the light of the following description.

In accordance with this invention, generally stated, a method of determining the CPK concentration in unpurified animal media is provided which includes mixing an exactly known amount of phosphocreatine solution and an exactly known amount of animal media containing an unknown amount of CPK, thereafter adding an exactly known amount of ADP and glutathione, thereafter incubating the mixture for an exactly known length of time at an exactly known temperature, thereafter stopping the reaction without deproteinizing the solution, adding to the undeproteinized solution a known amount of a compound which forms with creatine a colored solution, the depth of color of which (measured as optical density or percent transmission) is a function of the amount of creatine, and permitting the color to develop, thereafter centrifuging the solution without deproteinizing the solution, and then determining the depth of color, hence the amount of creatine and the amount of CPK. The final step is conveniently done graphically.

In the preferred embodiment of method of this invention, the compound which forms the colored solution is α-naphthol and diacetyl and the color is permitted to develop for twenty minutes at 37° C. In the preferred embodiment, the entire procedure is carried out in a single tube, and the glutathione and ADP are packaged together and introduced to the reaction simultaneously.

In the example illustrating the preferred embodiment of method, the CPK activity is defined in terms of "Sigma" units per ml. serum. A Sigma unit is defined as the amount of CPK which will phosphorylate one millimicromole of creatine per minute at 25° C. when the test is performed as per ultraviolet procedure described in Sigma Technical Bulletin No. 40–UV (Sigma Chemical Company, St. Louis, Missouri). This makes the units of the present procedure directly comparable to the units obtained in the 40–UV test.

The preferred method is illustrated in the following example:

EXAMPLE

The following reagents are prepared:

(A) Phosphocreatine solution in magnesium-tris buffer prepared as follows: (45 mg. phosphocreatine, sodium salt, hydrate, dissolved in 15 ml. of 0.0096 M magnesium sulfate and 0.16 M tris-(hydroxymethyl) aminomethane which had been adjusted to pH 7.5 at 25° C. with HCl.)

(B) Adenosine diphosphateglutathione solution (52 mg. ADP, sodium salt, hydrate; 37 mg. glutathione, reduced form, in 6 ml. water.)

(C) p-Hydroxymercuribenzoate solution, 0.05 M, prepared as follows: (2.1 grams of p-hydroxymercuribenzoate, sodium salt, are dissolved in 50 ml. of 1.0 N sodium hydroxide; add 45 ml. of 1 N HCl slowly with constant stirring and finally dilute with water to 100 ml.)

(D) α-Naphthol, 200 mg., dissolved in 10 ml. of alkali solution. (The alkali solution consists of 0.60 gram sodium hydroxide and 1.6 grams sodium carbonate, anhydrous, q.s. to 10 ml. with water.)

(E) Diacetyl solution (.1 ml. diacetyl in 200 ml. water).

(F) Creatine standard solution (4.0 micromoles creatine in 10 ml. water).

The standard creatine solution (reagent F) is used to prepare a calibration curve, using the colorimeter which is to be employed in the tests. Only one calibration curve need be prepared for any one colorimeter at a particular wave length, but different colorimeters and different wave lengths will produce different results. Accordingly, in running any series of tests, the same colorimeter at the same wave length, should be used.

As an example of a method of preparing a calibration curve, six samples of creatine solution are made up as indicated on the following table:

PREPARATION OF CREATINE, CPK CALIBRATION CURVE

| (1) | (2) | (3) | (4) | (5) | (6) |
|---|---|---|---|---|---|
| Tube No. | Creatine Std. Soln. (Reagent F) (ml.) | Water (ml.) | O.D. | Equivalent to Sigma units CPK/ ml. serum | Micromoles of Creatine each tube |
| 1 | 0   | 1.0 | 0    | 0   | 0    |
| 2 | 0.2 | 0.8 | .135 | 32  | 0.08 |
| 3 | 0.4 | 0.6 | .275 | 64  | 0.16 |
| 4 | 0.6 | 0.4 | .413 | 96  | 0.24 |
| 5 | 0.8 | 0.2 | .550 | 128 | 0.32 |
| 6 | 1.0 | 0   | .690 | 160 | 0.40 |

To obtain the figures in column 4, the amounts of creatine standard solution and water indicated in columns two and three of the table are placed in the six tubes identified in column 1. To each tube is added 1.0 ml. α-naphthol solution, 1.0 ml. diacetyl solution, and 7.0 ml. water. The contents are mixed and permitted to stand at room temperature (25° C.±5° C.) for 15 minutes for color development. The optical density (or percent transmission) of each tube is then obtained and the figure entered in column 4. The readings should be completed within ten minutes after the color development period is ended. A calibration curve is then drawn, on rectangular coordinates, one of which represents the optical density (or percent transmission), and the other, Sigma units of CPK per ml. of serum. The test results when the method of this invention is applied to unpurified animal media, are then converted from units of optical density (or percent T) to Sigma units of CPK per milliliter of serum, by means of the calibration curve.

The data from which the curve is plotted are obtained from the results of the observed OD (or percent T) (column No. 4) in which, for purposes of illustration, a set of typical readings from a Beckman DU colorimeter, at a wave length of 520 m$\mu$, is given.

One is now ready to make a determination of CPK activity in the unpurified animal medium, which in this illustrative example, is serum.

Two cuvettes for the colorimeter are labeled "Test" and "Blank," respectively. Into both tubes, 0.5 ml. of phosphocreatine solution (reagent A) is pipetted. Into the "Test" tube only, is pipetted 0.1 ml. of a ten-fold dilution of serum in water. Into the "Blank" tube, 0.1 ml. water is pipetted. Both tubes are placed in a water bath at 37° C., until they have reached that temperature.

The exact time of the next step is noted. This step is the addition of 0.2 ml. of the ADP-glutathione solution (reagent B) to each tube. The tubes are shaken gently and replaced in the water bath, and permitted to incubate for exactly 30 minutes.

At the end of the 30 minutes incubation, there is added to each tube 0.2 ml. of p-hydroxy mercuribenzoate solution (reagent C) which is mixed in throughly, to stop the reaction. This reagent does not deproteinize the test solution.

To each tube is then added 1.0 ml. α-naphthol solution (reagent D), 1.0 ml., .05% diacetyl solution (reagent E) and 7.0 ml. water. The contents of the tube are mixed after each reagent addition.

The tubes are then replaced in the water bath at 37° C. for 15–20 minutes, to permit the color to develop.

Both tubes are then centrifuged for 5 minutes.

The OD (or percent T) of the supernatant liquid is then determined on the colorimeter for which the calibration curve has been prepared. The "blank" tube is used as a reference in the same instrument and at the same wave length as that used in preparing the calibration curve and in obtaining the OD or percent T of the "test" tube. The reading should be completed within 10 minutes after centrifuging.

The CPK activity of the serum, which is the CPK activity indicated by the curve, less any apparent CPK activity of the blank, can then be determined directly.

If the activity of the test sample exceeds 160 Sigma units per milliliter the determination should be repeated using a greater dilution of the serum, and multiplying the results by the appropriate factor. For example, if twice the dilution is used, the CPK activity should be multiplied by two. Alternatively, the incubation period can be reduced, and the results multiplied by the same factor. For example, one can incubate the mixture for 15 minutes instead of 30 and multiply the result by two.

Only one blank is needed for any number of tests being performed at one sitting, using the same reagents and colorimeter.

It will be observed that the color development of the calibration curve samples was carried out at 25° C., whereas the color development of the test sample was carried out for an equal length of time at 37° C. This is because, while the color develops fully at 25° C. in the absence of serum proteins and other components of the test reaction mixture, it has been found that the higher temperature is essential to proper development of the color in the test reaction mixture within the prescribed time.

Numerous variations in the method of this invention within the scope of the appended claims will occur to hose skilled in the art in the light of the foregoing disclosure. For example, while the use of glutathione as the sulfhydryl has numerous and important advantages, especially in the combination of glutathione and ADP, cysteine and 2-mercaptoethanol may be used without deproteinization if they are fresh and added separately.

Having thus described the invention, what is claimed and desired to be secured by Letters Patent is:

1. The method of determining the CPK concentration in unpurified animal media consisting essentially of mixing an exactly known amount of phosphocreatine solution, an exactly known amount of animal medium containing an unknown amount of CPK, an exactly known amount of ADP, and a sulfhydryl compound taken from the group consisting of glutathione, cysteine and 2-mercaptoethanol; thereafter incubating the mixture for an exactly known length of time; then stopping the reaction without deproteinizing the solution; then adding to the undeproteinized solution a known amount of a compound which forms with creatine a colored solution, the depth of color of which is a function of the amount of creatine, and permitting the color to develop; and then determining the depth of color, hence the amount of creatine, hence the amount of CPK.

2. The method of claim 1 wherein the compound which forms the colored solution is made up of α-napthol and diacetyl and the color is permitted to develop for about 15–20 minutes.

3. The method of claim 1 wherein the entire procedure is carried out in a single tube.

4. The method of claim 1 wherein the sulfhydryl compound is glutathione and the glutathione and ADP are intermixed and then added together to the solution.

5. The method of determining the CPK concentration in unpurified animal media consisting essentially of mixing an exactly known amount of phosphocreatine solution, an exactly known amount of animal medium containing an unknown amount of CPK, an exactly known amount of ADP and glutathione; thereafter incubating the mixture for an exactly known length of time; then stopping the reaction without deproteinizing the solution; then adding to the undeproteinized solution a known amount of a compound which forms with creatine a colored solution, the depth of color of which is a function of the amount of creatine, and permitting the color to develop; centrifuging the solution without deproteinizing the solution; and determining the depth of color, hence the amount of creatine, hence the amount of CPK.

6. The method of claim 1 wherein, after the color is permitted to develop, the solution is centrifuged without deproteinizing the solution.

References Cited

Nichol, Clinica Chimica Acta vol. 11, pp. 404–407, May 1965.

Wilkinson, An Introduction to Diagnostic Enzymology, Edward Arnold (Publishers) Ltd., London, pp. 246 and 247, 1962.

ALVIN E. TANENHOLTZ, Primary Examiner